United States Patent
Ehrenberg et al.

(10) Patent No.: US 8,392,269 B2
(45) Date of Patent: Mar. 5, 2013

(54) PURCHASING SYSTEM AND A METHOD FOR COMPUTERIZED SELLING IN A SERVICE STATION

(75) Inventors: Yishay Ehrenberg, Tel Aviv (IL); Rahav Barkay, Herzliya (IL)

(73) Assignee: Bebuy Ltd, Tel Aviv (IL)

( * ) Notice: Subject to any disclaimer, the term of this patent is extended or adjusted under 35 U.S.C. 154(b) by 31 days.

(21) Appl. No.: 13/118,616

(22) Filed: May 31, 2011

(65) Prior Publication Data

US 2011/0295713 A1 Dec. 1, 2011

Related U.S. Application Data

(60) Provisional application No. 61/349,905, filed on May 31, 2010.

(51) Int. Cl.
*G06Q 30/00* (2006.01)

(52) U.S. Cl. .................................................. 705/26.1
(58) Field of Classification Search ................. 705/26.1
See application file for complete search history.

(56) References Cited

U.S. PATENT DOCUMENTS

| | | | |
|---|---|---|---|
| 2007/0187183 A1* | 8/2007 | Saigh et al. | 186/53 |
| 2010/0280956 A1* | 11/2010 | Chutorash et al. | 705/64 |
| 2011/0106613 A1* | 5/2011 | Felt et al. | 705/14.46 |

* cited by examiner

*Primary Examiner* — Mila Airapetian
(74) *Attorney, Agent, or Firm* — Mark M. Friedman

(57) ABSTRACT

A portable purchasing device is delivered to a vehicle of a customer of a service station. The customer initiates a purchase order by using the portable purchasing device. The purchase order is transmitted by the portable purchasing device, to a central purchase management computer that adds the purchase order to an order queue. A basket that includes products indicated in the purchase order, is delivered to the vehicle.

20 Claims, 5 Drawing Sheets

PURCHASING SYSTEM AND A METHOD FOR COMPUTERIZED SELLING IN A SERVICE STATION

CROSS-REFERENCE TO RELATED APPLICATIONS

This application claims priority of Provisional Patent Application 61/349,905, filed May 31, 2010.

FIELD AND BACKGROUND OF THE INVENTION

The present invention relates to selling products from a convenience store in a service station and, more particularly, to a system and method for utilizing a portable device delivered to a driver of a fueling car or a driver who stop near the pump, for facilitating purchase from the convenience store in the gas station during fueling and without going out of the car.

Traditionally, gas stations were founded in order to provide drivers an easy way of fueling their cars. In time, as gas stations' owners wanted to increase their revenues, additional services were built around the gas stations. Nowadays, common services of a typical gas station include: car-wash, convenience stores, garages, restaurants and coffee shops.

Gas stations merchants invest substantial budgets and efforts trying to get customers, that visit the station, to get out of the car, step into the convenience store and make some purchases. Obviously, only low percentage of the total amount of drivers, visiting the station, leave their cars and step into the convenience store. The percentage of drivers that visit the convenience store is about 15 percent of the cars passing through the station. The rest of the drivers just stay in their cars, fueling and leave the station without visiting the convenience store.

The drivers may have various reasons to stay in their cars such as: Stay in the car due to weather—too hot, too cold, rainy, snowy etc.; Stay in the car due to valuables in the car—computer, merchandise, documents etc.; Stay in the car due to children in the car, as the parent doesn't want to leave them alone or have them wondering around the gas station; Avoiding queues hassle—in the store or near the pump, cannot find a parking place; and other reasons.

While in the car, waiting for their car to be filled up with gas, the drivers are practically doing nothing. It is a good three to seven minutes that are available, though wasted time. During this time there is no significant effort to sell the customers anything else but the fuel while actually there is a huge captive market for customers.

The image of the convenience stores has been significantly improved in the last years. Nevertheless, any product that is sold in the vicinity of the gas pump is considered to be unclean, badly maintained (exposed to sun etc.) and usually only limited number of products are offered to the drivers near the pumps.

There is a need to expose the products of the convenience store to the drivers that wait in their cars and to provide drivers the ability to purchase products, while fueling, without leaving the car area.

SUMMARY OF THE INVENTION

According to the present invention there is provided a method for computerized selling of products in a service station. A portable purchasing device is delivered to a vehicle of a customer of a service station during fueling or while staying near the pump. The customer initiates a purchase order by using the portable purchasing device. The purchase order is transmitted by the portable purchasing device, to a central purchase management computer that adds the purchase order to an orders queue and allows a sales person to select the purchase order, from the orders queue, for preparing a basket. The basket that includes products indicated in the purchase order, is delivered to the vehicle.

The method includes, during the initiation of the purchase order, allowing the customer to select at least one product to be included in the purchase order.

The method further includes, during the initiation of the purchase order, allowing the customer to swipe a payment card by using an integrated magnetic stripe reader of the portable purchasing device; and obtaining, by the integrated magnetic stripe reader, details of the payment card. The purchase order includes the details of the payment card.

The method includes notifying, by the purchase management computer, a location and availability of the portable purchasing device.

The basket is delivered to the vehicle in the location indicated in the notification.

The method includes fetching the portable purchasing device from the vehicle, following the notification. The fetching is from the vehicle in the location indicated in the notification.

According to the present invention there is provided a purchasing system that resides in a service station and includes: (a) multiple portable purchasing devices adapted to be delivered to vehicles of customers of the service station, each portable purchasing device includes: (i) a processor for allowing the customer to initiate a purchase order; and (ii) a wireless transceiver for transmitting the purchase order, to a purchase management computer; (b) the purchase management computer is configured to add the purchase order to an orders queue and to allow a sales person to select the purchase order from the orders queue, for preparing a basket to be delivered to the vehicle.

Each of the portable purchasing devices further includes an integrated magnetic stripe reader for allowing the customer to swipe a payment card and for obtaining details of the payment card. The purchase order includes the details of the payment card.

The processor is configured to allow the customer to select at least one product to be included in the purchase order.

The purchase management computer may notify a location and availability of the portable purchasing device.

The purchasing system includes at least one device locator coupled to the purchase management computer for detecting a location of each of the portable purchasing devices. The purchase management computer notifies the location based on the detection by the at least one device locator.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention provides additional services and added values to the customers in a gas station. The added values will attract more customers into the gas station and by implementing a natural and intuitive user interface and sales approach, will encourage the customers to spend more money while staying in the gas station, fueling their cars. The merchants will provide better and unique services to the customers and will increase their revenues.

The key concept of the solution is to make the fuel pump area a convenience store terminal. This concept enables addressing all the drivers that stay in their cars and offering them the variety of products available in the convenience store. Addressing the customers can be done by various means which may include screens with advertisements and hand held devices that enable the driver or others in the car to make a purchase order.

According to the present invention, while the driver is waiting for his car to be filled up with gas, a portable handheld device, adapted for virtual purchasing, is provided to the driver (or to any other passenger in the car) to be used in the car, during the fueling. All the content and products of the station's convenience store are virtually revealed to the customer by operating the simple to use portable device, without needing to step out of the car. The customer can choose products he wishes to purchase and then pay for the purchase, by using the device, within the privacy of the car, without requiring any intervention by a sales person. Before or by the time the fueling is completed, the ordered goods are delivered to the car. In most cases, the purchased products will be brought to the car by the stations' staff.

Figure 1:
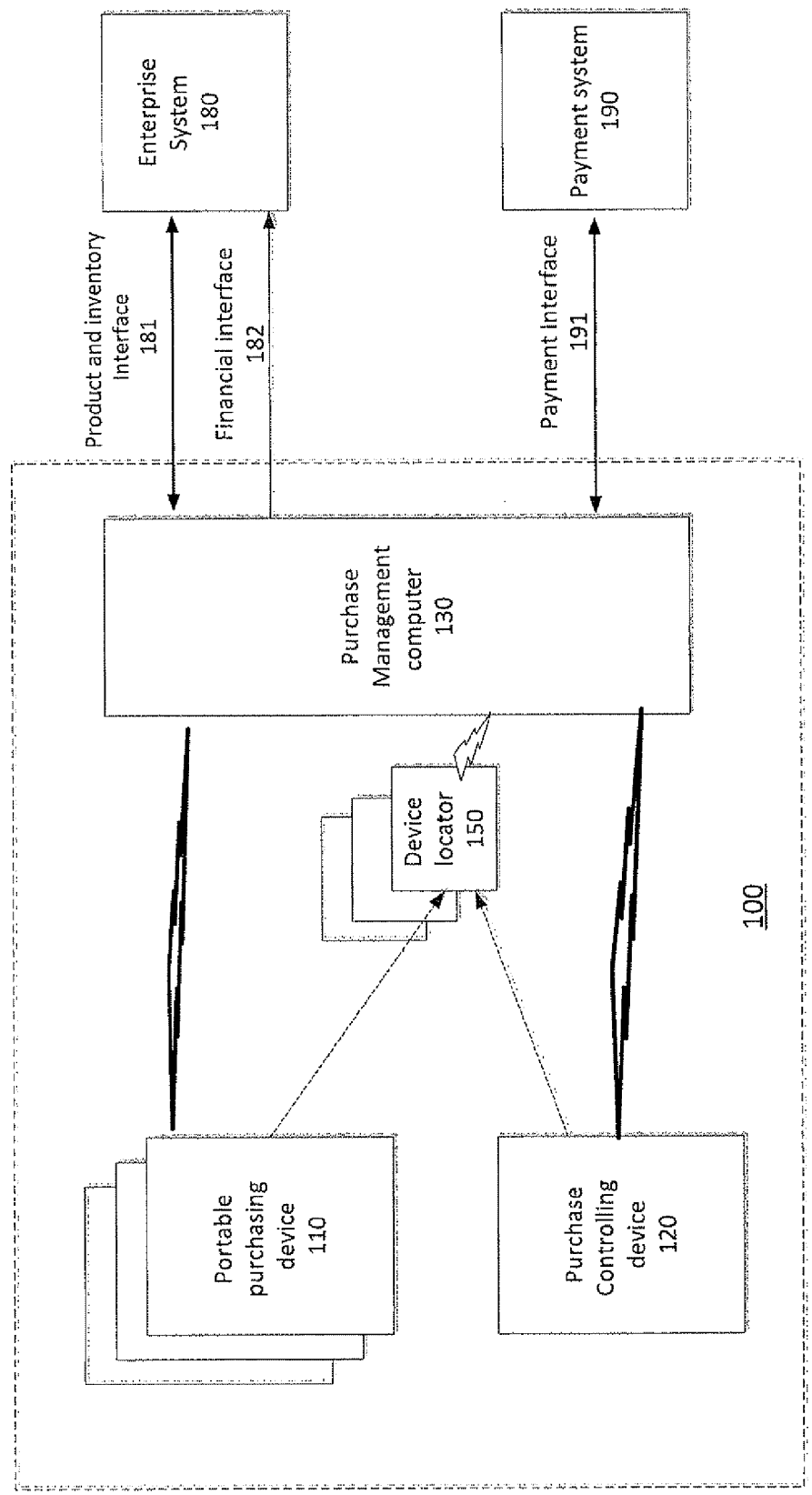
FIG. 1 is a block diagram of a purchasing system, according to an embodiment of the invention.

FIG. 1 is a schematic block diagram of a purchasing system 100 that resides in a service station. Purchasing system 100 includes multiple portable purchasing devices 110 that are delivered to the cars, while fueling. Portable purchasing devices 110 are handheld devices adapted to be used by customers of the gas station (i.e. drivers or other passengers), to submit their purchase orders during their stay in the gas station, while seating in the car or in the vicinity of the car, usually near the pump that is being used for fueling. Portable purchasing device 110 allows the customer to browse a menu, to select desired products and to place an order.

Purchasing system 100 may include at least one purchase controlling device 120, preferably a portable device, to be used by a sales person of the store, for supervision purposes, such as: displaying status of orders and orders queue, receiving notifications about purchasing devices to be collected from the cars after the customers completed an order placing, receiving notifications of orders that are ready for delivery to the cars, etc.

Purchasing system 100 may include at least one device locator 150 that is installed in the pump area and adapted to trace a location of the portable devices and to detect a movement of a device in case a vehicle is leaving the pump area without returning portable purchasing device 110. Device locator 150 may include an RFID reader or may use GPS capabilities.

Purchasing system 100 further includes a central purchase management computer 130, which may be a back-office server of the gas station, a dedicated special purpose computer, but may also be a remote central server. Purchase management computer 130 receives purchase orders from the multiple portable purchasing devices 110, manages the orders and communicates with a payment system 190 (typically, a remote system of a credit card provider). Purchase management computer 130 may also communicate with at least one enterprise system 180 (e.g. ERP) for finance and inventory updating and for retrieving products' prices and availability.

Portable purchasing devices 110, purchase controlling device 120 and device locators 150 are wirelessly communicating with purchase management system 130.

Figure 2:
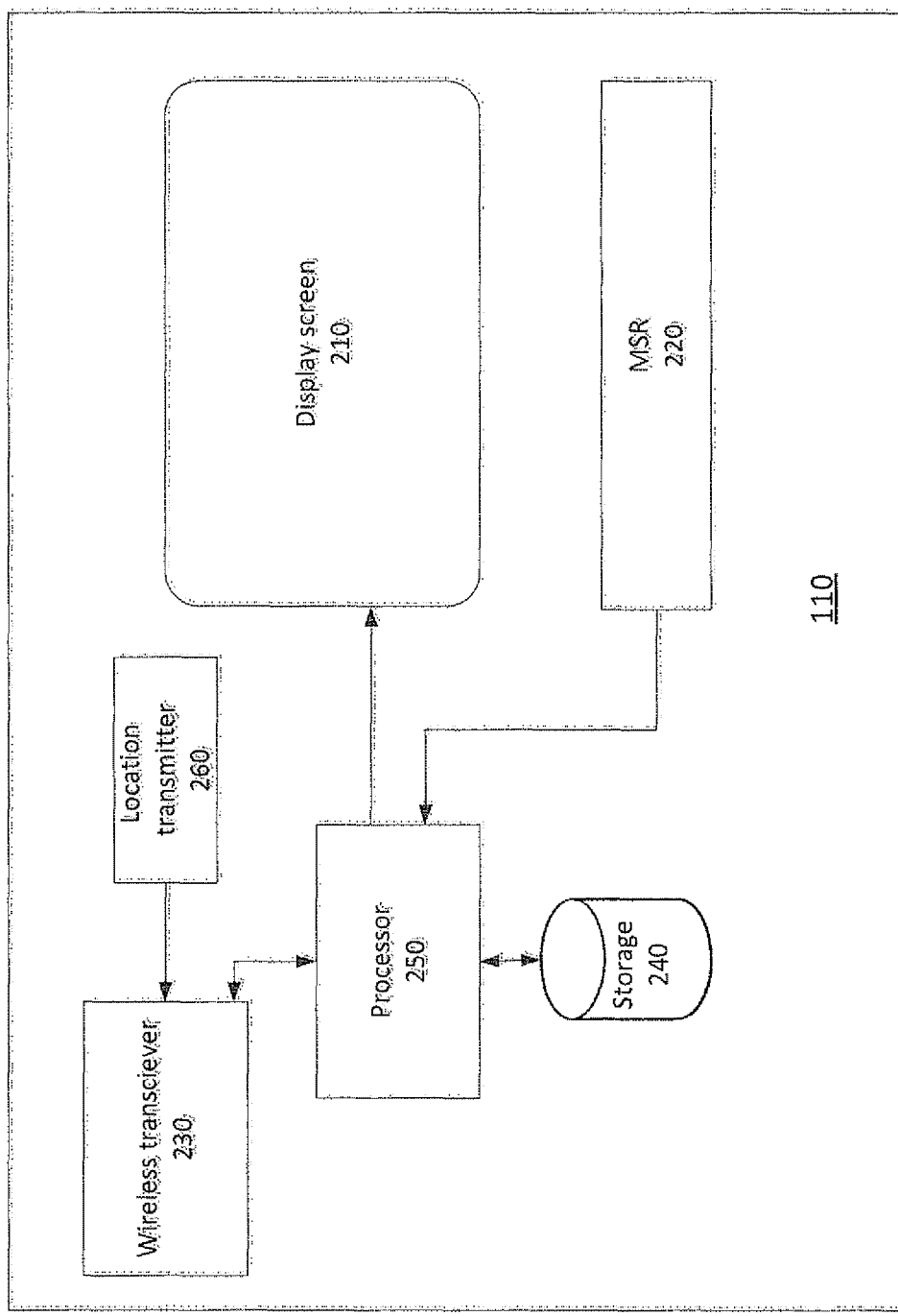
FIG. 2 is a block diagram of a portable purchasing device, according to an embodiment of the invention.

FIG. 2 is a schematic block diagram of portable purchasing device 110, which is a handheld device that runs a special purpose purchasing application.

Portable purchasing device 110 includes a display screen 210 for displaying menus, product list, products photos and details, sales and promoted products announcements. Preferably, display screen 210 is a touch screen and is adapted for reading user selections, but a keyboard for inputting selections may also be implemented.

Portable purchasing device 110 may optionally include an integrated magnetic stripe reader (MSR) 220, for receiving payments by swiping a payment card.

Portable purchasing device 110 further includes a wireless transceiver 230 for receiving menu pages with product information from purchase management computer 130 and for transmitting purchase orders towards purchase management computer 130.

A storage device 240 is configured for temporal storing user's selections, e.g. products that the user places in the virtual basket. Storage device 240 may be a volatile memory (e.g. RAM) or non-volatile memory (flash memory, hard disk, NVRAM).

Portable purchasing device 110 may optionally include a location transmitter 260 that in conjunction with device locator 150, enables detecting a location of portable purchasing device 110 and enables detecting a movement of a vehicle having a portable purchasing device in the vehicle. Location transmitter 260 may have GPS capabilities, may be an RE transmitter that transmits the ID of the device or may use any other location tracking technology.

Portable purchasing device 110 includes a processor 250 for controlling wireless transceiver 230, MSR 220, storage 240 and display screen 210. Processor 250 is configured to conduct the communication with purchase management computer 130 and to allow the customer to initiate a purchase order, including: receiving product selections from the customer, building a virtual shopping basket that contains a product list and the total price and submitting the order to purchase management computer 130.

Portable purchasing device 110 runs a dedicated purchasing application that includes a special purpose user interface adapted for purchases within the service station. The user interface used for displaying on display screen 210 is a web based solution. Web browsing and managing the browser have already become a common knowledge. By using a simple and intuitive web application the customers can break any familiarization barrier and make a purchase. The user interface of portable purchasing device 110 is easy to use and tempting. The application, although using web based technology, may be implemented as an intranet solution, allowing a variety of solution architectures to be implemented. In general, the customers' application will be arranged as a grid of categorized products. By default, the "On Sale" or "Special Offers" category will be presented. It is up to the store manager to arrange the products. Each product is associated with a clear photo, text and price. The customer makes a selection by touching the desired products displayed on the screen. Very much like a kid in a candy store: you touch what you want. The customer may control the amount of items of the same product to be purchased. When the customer chooses a product, the product will be added to a virtual "Shopping Basket".

At any time, the customer may choose to pay, manage the shopping basket or abort the session. Payments may be made by credit or debit card. MSR 220 of portable purchasing device 110 allows receiving payments by swiping a payment card. Alternatively, the customer may choose to pay in cash or use any other payment means. The customer will indicate he prefers paying in cash, so that the payment will be made upon delivery of the products.

The advantages of using portable purchasing device 110 instead of just browsing the store website by using a general purpose computer owned by the customer are: (i) portable purchasing device 110 runs a dedicated purchasing application with a friendly user interface that does not requires knowledge of using URL addresses or entering websites; (ii) the customer may not have a computer in the car. Portable purchasing device 110 is handy and delivered to the driver while staying in his car.

Portable purchasing device 110 may be a special purpose device or can be an off the shelf device that runs the dedicated purchasing application. The following is a non-limiting list of general purpose devices that can be used as portable purchasing device 110 or as purchase controlling device 120: tablet PC, Wireless POS PDA, Mobile Phone or any other portable handheld device that includes at least: a wireless communication means using wireless protocols (e.g. RF, cellular), a display screen (preferable a touch screen), a memory/storage device, a processor and optionally an integrated magnetic stripe reader.

Using a tablet PC, running a browser application on and having a touch screen, enables the customers to touch the products' icons they want and adding the products into their shopping basket. The tablet PC with its larger screen provides the capability of presenting a relatively large amount of products on the screen. The tablet PC holds a variety of capabilities allowing a smooth and easy shopping experience. Such capabilities are: (i) Large screen with outdoor-viewable display capability; (ii) Magnetic Stripe Reader (MSR); (iii) Rubber Grips and an elastic wrist band; and (iv) hot-swappable external battery for continuous use.

Wireless POS PDAs (PDAs for Point Of Sale applications) have wireless communication capabilities allowing to be used as a web browsing device. The POS PDA has in many cases a Magnetic Stripe Reader (MSR) allowing the users to pay using their credit card without having to type the numbers in. The POS PDA devices are comfortable to carry around and may be implemented as part of the solution for the sales person or supervisor functions (i.e. purchase controlling device 120).

Referring back to purchase management computer 130, which may be a back office server of the shop/gas station that handles all aspects of the shop that are not customer facing. Purchase management computer 130 receives the customers' orders that need to be prepared. Products and prices are managed either by purchase management computer 130 or extracted from the merchant's ERP system. The following sections describe the components included in purchase management computer 130: order management, product managements, reports and statistics and content management.

The order management component enables the store staff to receive the orders initiated by the customer with all the relevant products' details. The order management component handles an orders queue that includes details for each order. A new order that is received from one of the portable purchasing devices is added at the bottom of the queue, that is probably handled in a FIFO (first in first out) manner. The sales person may change the sequence and priorities of the orders in the queue, e.g. promote an order to the top of the queue.

Figure 5:
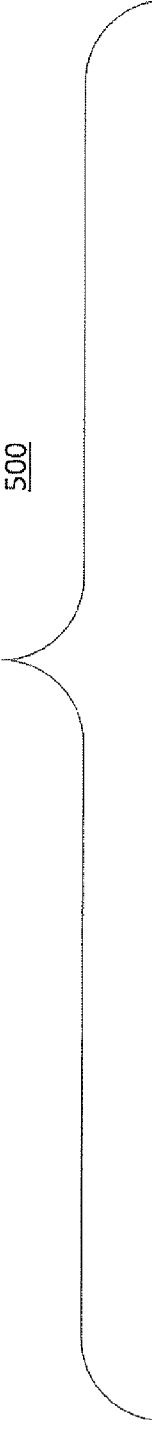
FIG. 5 illustrates a schematic diagram of an orders queue.

FIG. 5 illustrates an example of an orders storage 500 that includes an entry with order details 580 for each order (1 to in) in the system. Each order details 580 includes the following parameters: (i) an order ID 501—an identifier that uniquely identifies the order in the system; (ii) an order time 502 includes the received time of the order; (iii) a payment type 503 may include whether the order was paid by a credit card (or any other type of card) or the order is to be paid cash upon delivery of the basket; (iv) a station number (e.g. a pump number) that identifies the location of the vehicle; (v) a product list 510 includes all the products that were selected for purchasing by the customer and for each product: a product ID 511 (e.g. a catalog number, a description) and amount 512; (vi) a total price 520 for the basket; and (vii) an order status 530 that may include: 'ready for delivery', 'basket was delivered', 'basket is being prepared', 'preparation not yet started' and so on. Order status 530 may be changed by the store's personnel and may be distributed to purchase controlling device 520, as a notification. Purchase controlling device 520 may be notified when the status is changed to 'ready for delivery' and may be also notified when a new order is added to the queue. It should be noted that fields 501-530 are exemplary fields and other or additional fields may be implemented. All the details of the order queue and/or details of a specific order may be displayed on the screen that is coupled to purchase management computer 130 and/or on the screen of purchase controlling device 520.

The order will be assigned to a store employee that will prepare the ordered products for delivery. Order status is managed as part of the process allowing the store team to easily identify what needs to be done and who handles which order.

The products management component allows the store staff to manage any products related information. The system maintains the product name, price, photo and other relevant data that describes the product. The system also allows creating priorities in displaying the products on the page, which enables pushing products to a better position on the page when product promotion is needed.

Alternatively, the product management component can be centralized and managed in the store's chain ERP system. The products data can easily be extracted and populated into purchase management computer 130.

The report and statistics component provides a variety of reports for the use of different organizational functions. For each function the relevant reports can be generated. The reports can provide information of the overall store performance, while using purchasing system 100, as well as tracking the sales of a specific product. The following is a non-limiting list of report examples: Site statistics of entries and purchases; traffic per day; opened and closed orders, average sale, number of products, total sale amount; popular products over time period; and the like.

The system maintains, as part of the ongoing routine, any information related to the performed activity. Additional reports may be created as a need arises.

The content management component may offer specific campaigns to customers. Such campaigns may be presented as a banner on the web page or on the in-station screens. Such content may be managed by the content management component allowing the merchant and the convenience store staff to enable or disable campaigns based on any event or situation.

Essential parts of purchasing system 100 are its interfaces with external systems. The interfaces are data feed that enrich purchasing system 100 with accurate, reliable and up to date infatuation of products, prices, campaigns etc. The interfaces also provide means for approving and managing payments in a centralized system. Thus, allowing the merchants to have an overall view of their income. Two interfaces are illustrated in FIG. 1: product and inventory interface 181 and payment interface 191, both being handled by purchase management computer 130.

Products and inventory interface 181, between purchase management computer 130 and enterprise system 180, feeds the system with accurate products information. The product data is automatically extracted from enterprise system 180, such as the shop's ERP system, cashier system or any other organizational/financial system and transferred to purchase management computer 130. Non-limiting examples of product data includes: product id; product name; price and available quantities. On the other direction, purchase management computer 130 updates enterprise system 180, as an ongoing process, with products being ordered, for purposes of inventory updates. The frequency of the updates can be configured.

Payment interface 191 provides purchase management computer 130 means to request and receive credit card payment approval. In case the customer chooses to pay in cash or other means, the payment will be executed upon delivery of the purchased product.

All approved payments, either cash or credit, are transmitted to the store's payment system for tracking and accounting purposes.

Outside the store, the sales person is in charge of orchestrating the activities. The sales person presents the portable purchasing device 110 to the customer. He will need to know when the customer had completed his purchase so the device can be collected. He may also need to know when an order is ready for delivery. He may be required to go and pick it up or send someone to do so. Additionally the sales person may need to resolve any issue that may arise with the customers' orders.

In order to have the information for making such decisions and activities the sales person carries portable purchase controlling device 120 (FIG. 1), which may be a special purpose device or a general purpose device, e.g. a PDA. Portable purchase controlling device 120 displays a view that presents the orders queue, which is automatically periodically refreshed. By viewing the orders queue the sales person will see when a new order was placed. Based on this information, he can pick portable purchasing device 110 from the car. He will also be able to see that the order was prepared and either pick it up himself or send a colleague to do so.

If an issue arises the sales person will be able to edit the order and make the necessary adjustments to fulfill the customers' satisfaction.

Figure 3:
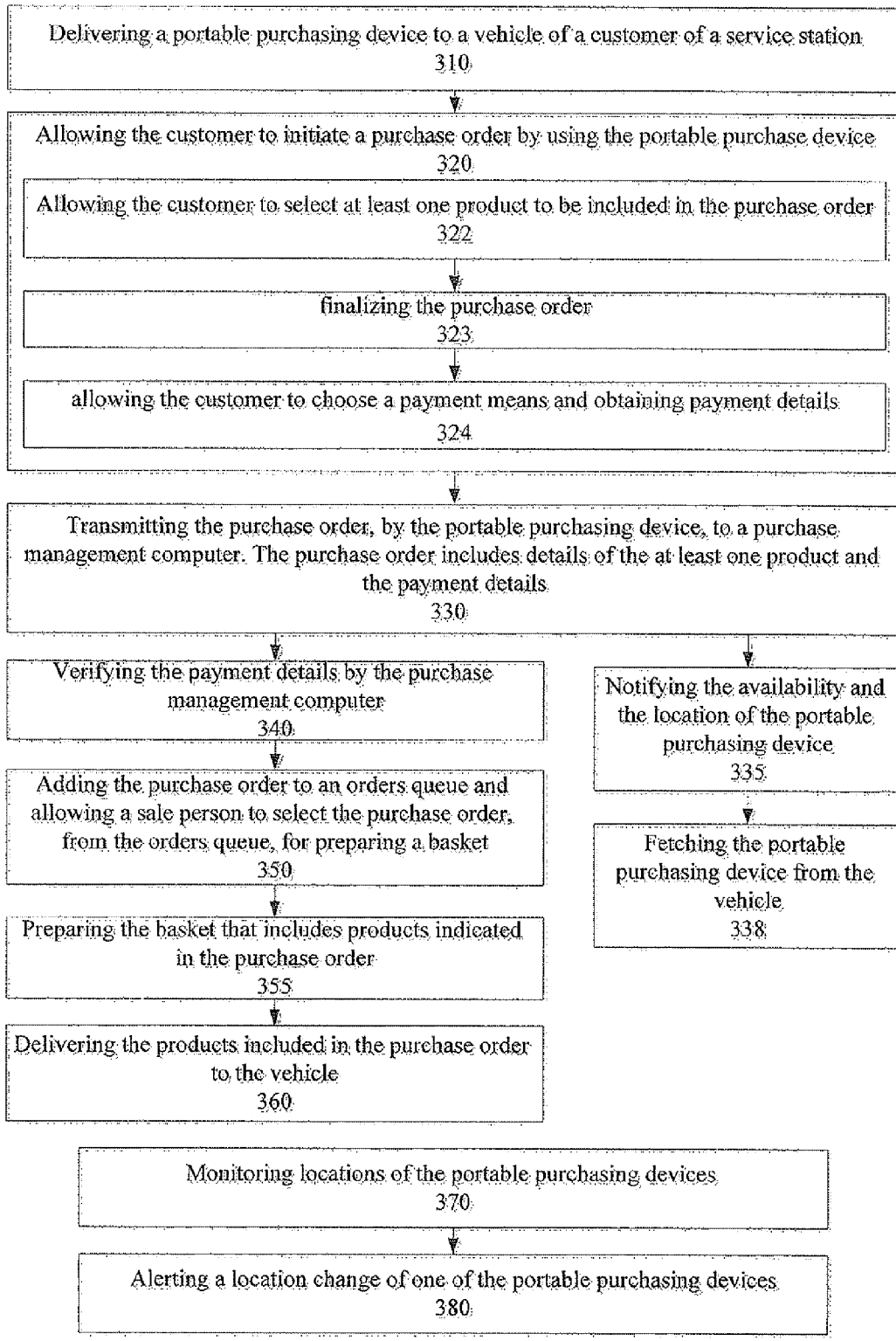
FIG. 3 is a flowchart of a method for computerized selling in a service station, according to an embodiment of the invention.

FIG. 3 illustrates a method 300 for computerized products selling in a service station.

Method 300 starts with a stage 310 of delivering a portable purchasing device to a vehicle of a customer of the service station, while the customer is waiting for fueling. The customer is the driver or a passenger in the car. The delivering may be done by a person, the store's sales person that presents the portable purchasing device to the customer. According to another embodiment, the delivering may be to the area of the fuel pump, within arm's reach of the driver, so that the driver may take the purchasing device from its position, preferably without needing to get out of the vehicle, and operate it while seating in the vehicle. Stage 310 may include detecting the vehicle, when the vehicle approaches the pump area of the service station and notifying the store's sales person about the arriving of the vehicle, so that the store's sales person will be able deliver the portable purchasing device to the vehicle, promptly, upon arrival. The detecting of the approaching vehicle may be manually detected by a person or by using sensors installed in the pump area. The notification regarding the approaching vehicle may be transmitted to purchase controlling device 120 and/or may be displayed on the screen that is coupled to purchase management computer 130.

Stage 310 is followed by a stage 320 of allowing the customer to initiate a purchase order by using the portable purchasing device.

Stage 320 includes stage 322 of allowing the customer to select at least one product to be included in the purchase order and adding selection's details to a product list of the purchase order. The selection's details include a product identification (e.g. a product name or product's catalogue number), the amount of instances of the same product and optionally, product characteristics (e.g. color, flavor, etc.). Stage 322 includes displaying products pages with: menus, product displays with photos, technical text information and prices. Stage 322 may include, prior to displaying, downloading updated product pages to be displayed, from the purchase management computer. Alternatively, the portable purchasing device may cache product pages in its memory and display the cached pages. Purchase management computer may send update notifications to all the portable purchasing devices, when an update to product pages occurs. When a portable purchasing device receives an update notification, it will download the new product pages, during its idle time and cache the new product pages in its internal memory/storage device. Stage 322 may be repeated if the customer selects more than one product.

Stage 322 is followed by a stage 323 of finalizing the purchase order, including displaying the product list that includes the details of all the products that were selected in stage 322, as well as displaying the total sum of the purchase order.

Stage 320 further includes stage 324 of allowing the customer to choose a payment means and obtaining payment details. The payment means may be: a credit card, a debit card, a prepaid card, or any other payment card, cash or any other payment means. If the customer chooses to use a payment card, then stage 324 may include allowing the customer to swipe a payment card by using an integrated magnetic stripe reader of the portable purchasing device; and obtaining, by the integrated magnetic stripe reader, details of the payment card. Alternatively, if the portable purchasing device does not include an integrated magnetic stripe reader, or if the card reading fails, then stage 324 includes allowing the user to manually enter the payment card's details. Stage 324 may be omitted if the customer chooses to pay cash (or use payment means other than a payment card) upon delivery of the products.

Stage 320 is followed by a stage 330 of transmitting the purchase order, by the portable purchasing device, to the purchase management computer. The purchase order includes details of the at least one product and the payment card's details. The transmission is a wireless transmission and may be implemented in various manners, for example: (i) a direct transmission from the portable purchasing device to the purchase management computer, by using a cellular transmission, or—if the distance is short—using an RF transmission or any short range transmission medium. Alternatively, all the portable purchasing devices may transmit, by using a short range medium (e.g. RF) to a central communication box located in the area of the fuel pumps and the central communication box forwards the messages to the purchase management computer, by using a long range medium (e.g. cellular communication).

Stage 330 is followed by a stage 340 of verifying the payment details by the purchase management computer. The purchase management computer communicates with card payment providers for verifying the card details and for executing the payment transaction.

If the verification of the payment details succeeds, then stage 340 is followed by a stage 350 of adding, by the purchase management computer, the purchase order to an orders queue and allowing a sales person to select the purchase order, from the orders queue, for preparing a basket. Stage 350 may also include assigning the purchase order to a human resource (i.e. a store employee) for preparing a basket. Method 300 includes other stages, not shown, for managing the orders queue: (i) assigning priorities to orders—generally the orders are handled as a FIFO (first in first out) but a sales person may change priorities of orders, for example: in case of a customer that has finished the fueling earlier than other customers; and (ii) displaying the order details on a screen, either as an item in the orders queue or displaying full details of the order. The screen may be a screen that is connected to the purchase management computer or may be the screen of the purchase controlling device of the sales person.

Stage 350 is followed by a stage 355 of preparing a basket that includes products indicated in the purchase order. Stage 355 is carried by the store's personnel. Stage 355 may be preceded by a stage of retrieving the details of the next order to be prepared, e.g. displaying or printing the details of the first order in the orders queue. Stage 355 includes gathering the products, wrapping the products in a package and marking the package with order details.

Stage 355 is followed by a stage 360 of delivering the products included in the purchase order to the vehicle.

Stage 330 may additionally be followed by a stage 335 of notifying the availability and the location of the portable purchasing device. Since the order was already placed, the portable purchasing device is no longer in use and can be fetched from the car. The notification is raised by purchase management computer 130 and may be displayed on a screen coupled to purchase management computer 130 and/or the notification may be transmitted to purchase controlling device that is being used by the sales person. The notification includes a location description of the car within which the device is. The location description may include a pump number or a visual map of the station with a visual indication of the car location on top of the map. The notification may be accompanied with an audio alert.

Stage 335 is followed by a stage 338 of fetching the portable purchasing device from the vehicle. The fetching may be done by the sales person. Stages 335 and 338 can be executed in parallel to either stage 340-360.

RFID is a common technology allowing a variety of applications. As such, within purchasing system 100, the RFID capabilities are implemented for controlling the whereabouts of the various devices of purchasing system 100. Most sensitive are the portable purchasing devices 110 that intentionally or not may still be in the car while it departs its location by the gas pump. There may be quite few reasons for the car to move. Either pure like moving to a waiting area if the order preparation time prolongs. In other cases the driver intentionally or unintentionally is leaving the gas station.

Such movement of the device outside of the gas pump perimeter is monitored by a set of RFID readers or GPS trackers, such as device locators 150. Method 300 includes background ongoing stages 370 and 380. Stage 370 includes monitoring locations of the portable purchasing devices. The monitoring is done by periodically reading location information from the at least one device locator 150. The location information can be used in stage 335, when notifying an availability of a portable purchasing device along with the device location. The location information can be also used for comparing consecutive readings of location information and for determining a location change of one of the devices. Upon detection of a location change, stage 370 is followed by a stage 380 of alerting the location change of the corresponding device. The alerting may include buzzer sound, activation of a camera etc. The alerting may include sending a location change alert to the purchase management device of the sales person. The location change alert may be visual and/or audible and may include the current location of the portable purchasing device.

Figure 4:
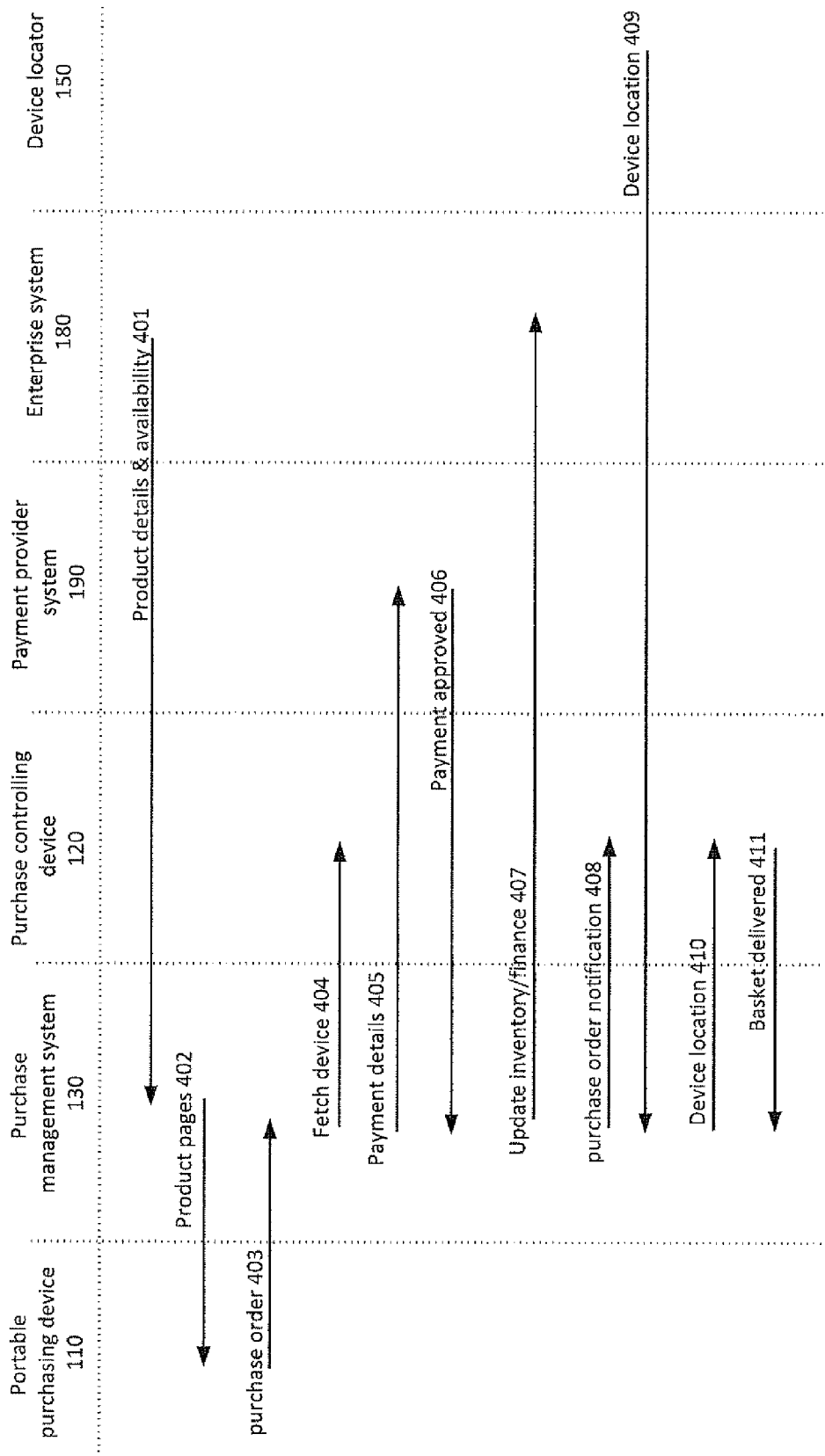
FIG. 4 is a sequence diagram illustrating the communication among devices and computers of the purchasing system.

FIG. 4 is a sequence diagram illustrating the communication among the devices and computers of purchasing system 100 and the communication with external systems.

Enterprise system 180 (e.g. ERP) optionally feeds purchase management system 130 with updates of products' details and availability 401. Alternatively, if enterprise system 180 does not exist, purchase management system 130 manages the inventory of the store and there's no need for message 401.

Based on products' details and availability 401, purchase management system 130 feeds portable purchasing devices 110 with product pages 402 to be displayed. Message 402 may be unsolicited or can be triggered by an explicit request from portable purchasing device 110.

Purchase order 403 is transmitted by purchasing device 110 to purchase management system 130 after the customer has completed the purchase. Purchase management system 130 sends a notification—fetch device 404 with an identification of the device that was just being used for placing the purchase order.

Concurrently with message 404, purchase management system 130 sends payment details 405 (extracted from the details of the purchase order) to payment provider system 190 (e.g. a credit card provider) for card details verification and for executing the payment transaction. Payment provider system 190 response with payment approved 406.

Once the payment is approved, purchase management system 130 can optionally send update inventory and finance 407 to enterprise system 180 (there may be two messages—one to a finance sub-system and one to an inventory sub-system). Concurrently, purchase order notification 408 is sent to purchase controlling device 120 for indicating that a basket can be prepared.

At any time, a device locator 150, if exists, may send device location 409 that includes the current position of portable purchasing device 100 to purchase management system 130. Purchase management system 130 may send, at any time, device location 410 to purchase controlling device 120. Message 410 may be sent only upon detecting a change in the device location or upon an explicit request of the sales person that uses purchase controlling device 120.

After the basket is delivered to the car, purchase controlling device 120 sends basket delivered 411 for updating the status of the order at purchase management system 130.

It is noted that other messages that are not illustrated may exist, such as status messages (e.g. 'basket is being prepared'). It is also noted that messages that are transmitted to purchase controlling device 120 may be alternatively or additionally, displayed on the local screen that is connected to purchase management system 130.

Purchasing system 100 optionally includes a marketing sub-system that allows the store manager or the chain management to provide the customers with information related to the products they can purchase. This information of teasers will be available in the following media set around the station. This media may include TV screens and information presented on the portable purchasing devices.

Purchasing system 100 enables the customer to register to the purchasing service by using their mobile phone or home internet. The registration process is quick, requires minimal standard information such as name address and credit card details. Following the registration, the customer is able to use purchasing system 100 in an easier way. Registered customers are the customer base of the business and can be approached with marketing initiative. The customers may receive various benefits to their mobile phone or email such as e-Coupons, encouraging them to shop.

The potential customers of the services supplied by purchasing system 100 are the drivers and passengers remaining in the cars while fueling it. The time window to offer the service, make the purchase and deliver the merchandise is a mere few minutes. Practically, three to seven minutes. The solution provider has control of the time since ordering until successful delivery. This is not much but still very doable. It is all dependent on the efficiency of the assigned employees and the procedures they follow.

In the next paragraphs the main procedures and considerations are provided.

Orders management is the heart of the process. Orders have to follow a strict process in order to ensure timely and accurate delivery. Managing an order process covers the activities starting when the order is received and displayed on the shop monitor and ends when the customer had received the goods, paid and is free to leave the station.

An order is initiated in the car using one of the available portable purchasing devices. All validity checks for the order are made before receiving it. Once received, the order enters the queue of orders which is displayed inside the shop. The handling method of the queue is FIFO (first in first out). The employee in charge of handling the next order assigns it to himself and start preparing the basket.

When preparing the basket, a sticker with order details can be printed and stuck on a basket. The order details are used to verify the products and to associate the basket and the car ordered it.

The employee will collect the items and place them in the basket. When done, the employee will take the basket to the car that placed the order.

In certain implementation it may be considered to separate the basket preparation and the basket delivery functions. Reasons for this may include size of the station and how busy it is.

The basket delivery person takes the basket to the car based on the indication on the basket. The sticker will indicate if a payment had been cleared. If necessary, the employee will collect the necessary amount upon delivery the basket.

Two main payment methods are handled, credit card (or any other payment card) and cash. Payment by credit card is cleared at the time the order is made. Once a credit card order enters the preparation queue it is considered to be financially cleared. If the customer indicated a cash purchase it will be indicated so on the sticker. The basket delivery person will verify this detail and make sure payment is received at time of delivery.

Managing the shop has two main aspects. First aspect is the management of the products to be sold using each of the user interface devices. Second aspect is management of the store floor/wall area so that efficient and accurate preparation and delivery of the basket can be achieved.

In the physical world it is well known that managing the products on the shelves has tremendous significance to the chance they will be bought. A product that its location stands out and is available to the customer has a higher likelihood to be picked by the customer.

The same concept exists in the virtual arena. It is highly important how many products appear on the web page. What is their location on the page and how complicated it is to access them and make an order that includes them.

It is up to the store manager or the chain management to decide which items are to be included and to be pushed to the better positions on the page. Such decisions are driven by marketing, from the local information in the gas station and information accumulated in the system which identifies customers' behavior.

The content of the pages has to be periodically verified and adjusted to fit management instructions.

The appropriate space for operating purchasing system 100 will need to be assigned in the shop. Such devices can be in the back room and not necessarily in the shop itself. It is dependent, among other factors, on the available space.

The back office equipment inside the shop includes:

One designated screen to display the orders queue. It is a touch screen device so no keyboard is needed.

One designated printer to print the order stickers/slips that are to be attached to the basket as part of the order preparation process.

Content will be created based on marketing needs. It will be managed and stored as part of purchasing system 100. The content will be created in order to serve any marketing need. It will be presented to the customers either on the hand held devices or in the gas-station area for example on signs or TV monitors.

According to another embodiment of the invention, purchasing system 100 supports remote shopping as well. With slightly different process the customers are able to shop using their own devices for example, mobile phones, laptop or home PC. This method of shopping is pretty much similar to any common shopping web site. The difference is with the method of delivery.

Purchasing system 100 supports a variety of alternative product delivery methods, such as self pick-up and home delivery. This allows the merchants or shop owners to expand their business outside their shop and do not require the physical presence of the customer.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for computerized selling of products in a service station, comprising the steps:

delivering a portable purchasing device to a vehicle of a customer of the service station;

allowing the customer to initiate a purchase order by using the portable purchasing device;

transmitting the purchase order, by the portable purchasing device, to a purchase management computer;

adding, by the purchase management computer, the purchase order to an orders queue and allowing a sales person to select the purchase order, from the orders queue, for preparing a basket; and delivering the basket that includes products indicated in the purchase order, to the vehicle.

2. The method of claim 1, wherein the step of allowing includes: allowing the customer to select a payment means.

3. The method of claim 1, wherein the step of allowing includes: allowing the customer to swipe a payment card by using an integrated magnetic stripe reader of the portable purchasing device; and obtaining, by the integrated magnetic stripe reader, details of the payment card; wherein the purchase order includes the details of the payment card.

4. The method of claim 1, wherein the step of allowing includes: displaying a product list and product details on a screen of the portable purchasing device.

5. The method of claim 1, wherein the step of allowing includes: allowing the customer to select at least one product to be included in the purchase order.

6. The method of claim 1 further comprising notifying, by the purchase management computer, a location and availability of the portable purchasing device.

7. The method of claim 6, wherein the delivering of the basket is to the vehicle in the location indicated in the notification.

8. The method of claim 6 further includes fetching the portable purchasing device from the vehicle, following the notification.

9. The method of claim 8, wherein the fetching is from the vehicle that parks in the location indicated in the notification.

10. The method of claim 1, further comprising: monitoring locations of the portable purchasing devices; and alerting a location change of one of the portable purchasing devices.

11. The method of claim 1, further comprising, prior to the delivering of the portable purchasing device, detecting the vehicle, when the vehicle approaches a pump area of the service station and notifying the sales person of the approaching car.

12. A purchasing system that resides in a service station, comprising:
(a) multiple portable purchasing devices, adapted to be delivered to vehicles of customers of the service station, each portable purchasing device includes:
(i) a processor for allowing the customer to initiate a purchase order; and
(ii) a wireless transceiver for transmitting the purchase order, to a purchase management computer;
(b) the purchase management computer, coupled to the multiple portable purchasing devices via a wireless communication channel, is configured to add the purchase order to an orders queue and to allow a sales person to select the purchase order, from the orders queue, for preparing a basket, to be delivered to the vehicle.

13. The purchasing system of claim 12, wherein each portable purchasing device further comprising an integrated magnetic stripe reader for allowing the customer to swipe a payment card and for obtaining details of the payment card; wherein the purchase order includes the details of the payment card.

14. The purchasing system of claim 12, wherein each portable purchasing device further comprising a screen for displaying a product list and product details.

15. The purchasing system of claim 12, wherein the processor is configured to allow the customer to select at least one product to be included in the purchase order.

16. The purchasing system of claim 12, wherein the purchase management computer is configure to notify a location and availability of the portable purchasing device.

17. The purchasing system of claim 12 further comprising at least one device locator, coupled to the purchase management computer, for detecting a location of each of the portable purchasing devices and wherein the purchase management computer is adapted to notify the location based on the detecting by the at least one device locator.

18. The purchasing system of claim 12 further comprising at least one device locator, coupled to the purchase management computer, for monitoring locations of the portable purchasing devices; and wherein the purchase management computer is configure to alert location changes of the portable purchasing devices.

19. The method of claim 1 wherein the service station is a gas station.

20. The method of claim 1 wherein the basket is delivered by a human.

* * * * *